(No Model.)
J. A. EVARTS.
SUSPENSION PULLEY.
No. 319,214. Patented June 2, 1885.
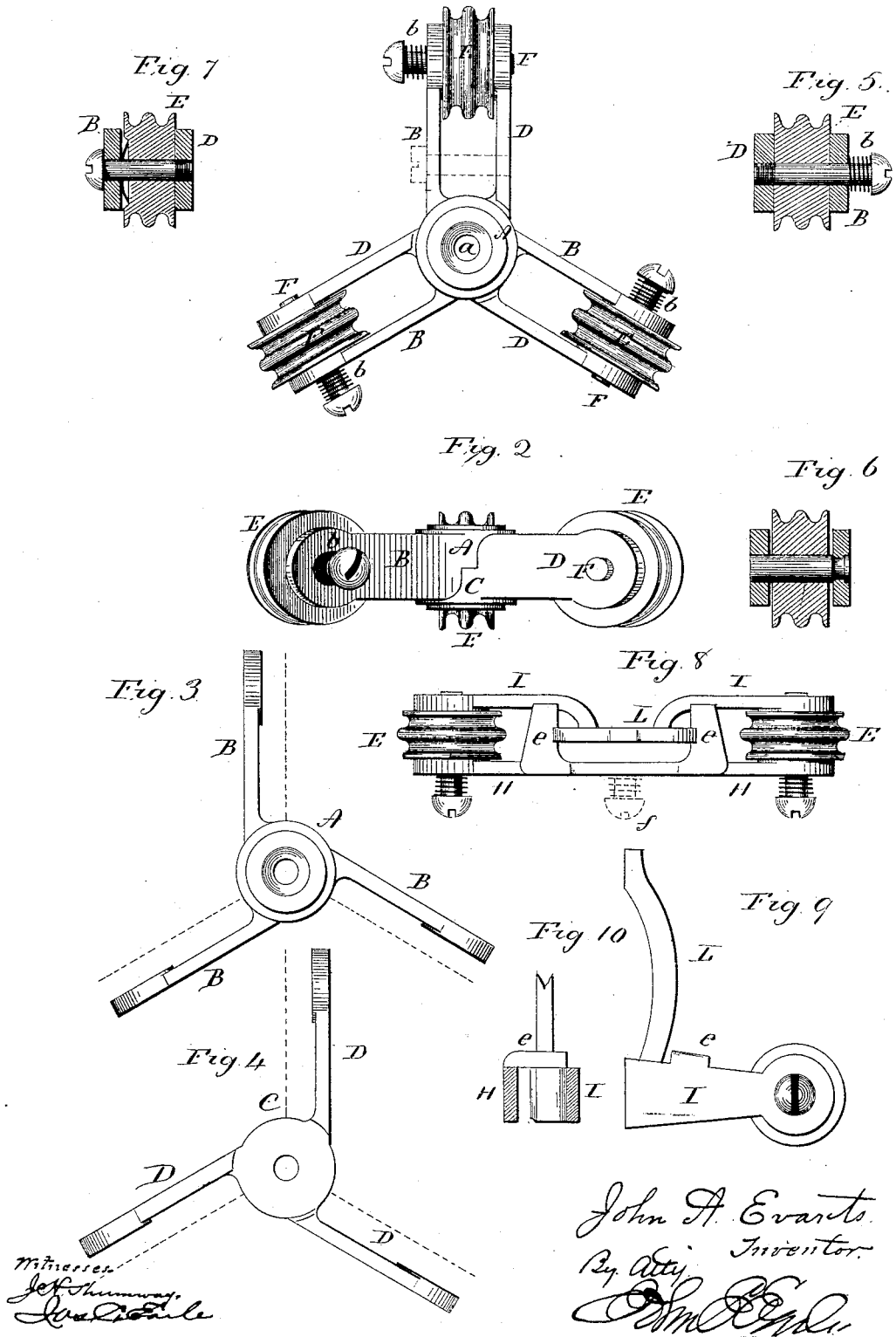

UNITED STATES PATENT OFFICE.

JOHN A. EVARTS, OF MERIDEN, CONNECTICUT, ASSIGNOR TO THE BRADLEY & HUBBARD MANUFACTURING COMPANY, OF SAME PLACE.

SUSPENSION-PULLEY.

SPECIFICATION forming part of Letters Patent No. 319,214, dated June 2, 1885.

Application filed March 30, 1885. (No model.)

*To all whom it may concern:*

Be it known that I, JOHN A. EVARTS, of Meriden, in the county of New Haven and State of Connecticut, have invented a new Improvement in Suspension-Pulleys; and I do hereby declare the following, when taken in connection with accompanying drawings and the letters of reference marked thereon, to be a full, clear, and exact description of the same, and which said drawings constitute part of this specification, and represent, in—

Figure 1, a top view of a suspension-pulley having three pulleys; Fig. 2, a side view of the same; Fig. 3, one of the hubs and its arms; Fig. 4, the other hub and its arms; Fig. 5, a transverse section through the arms, pivot, and pulley; Figs. 6 and 7, modifications upon the pivot; Fig. 8, the invention as applied to a two-pulley hanger; Fig. 9, a side view of one-half the hanger; Fig. 10, a transverse central section through the said hanger.

This invention relates to an improvement in hangers for that class of pulleys over which articles are suspended which it is desired to adjust or support at different elevations—such, for illustration, as lamps, flower-baskets, bird-cages, and the like—and which are counterbalanced by a weight or some equivalent therefor.

In the arrangement of a pulley of this character the weight must substantially counterbalance the thing suspended; but as the articles mentioned, or such as are suspended for household uses or for decorations, are liable to vary in weight—as, for illustration, flower-baskets will vary in weight, owing to variable quantities of earth introduced or from various degrees of dampness; lamps differ because of varying weight of shades or quantity of oil or from other causes—but the weight is and must be constant; hence in some cases if the pulley be free the weight will necessarily overbalance the article suspended, or in other cases the article may overbalance the weight. To obviate this difficulty, various frictional devices have been applied to pulleys.

The object of my invention is the construction of an extension-pulley for two or more chains or cords, and in which substantially an equal friction may be applied in a simple manner to all the pulleys; and the invention consists in the pulley-support constructed in two parts, one part carrying an arm upon one side of the pulley and the other an arm upon the opposite side said parts adapted to be drawn together to grasp the pulley between them with a greater or less amount of friction, and as more fully hereinafter described.

I will first illustrate my invention as for pulleys to carry three chains or cords, as the case may be.

A represents a central hub, from which extend three arms, B B B. The plane of each of these arms is at one side of a radial line, but parallel to said radial line, as indicated in Fig. 3, the distance between the radial line and the surface of the arm being little more than half the thickness of the pulley to be introduced. A second hub, C, is formed like the hub A, and from this in like manner extend three arms, D, (see Fig. 4;) but the arms on the hub C are upon the opposite side of the radial lines, as indicated in Fig. 4. The width of the arms is the same, but the hubs are of half the thickness of the arms, as seen in Fig. 2, and so that the hub A may be set upon the hub C, as seen in Figs. 1 and 2, and when so set the arms are in the same horizontal plane and substantially parallel with each other, as seen in Fig. 1. Through the hub is a central opening, *a*, by which the hanger may be suspended.

Between each pair of arms, near their ends, a pulley, E, is introduced upon an axis, and so as to revolve freely. The suspending device forms a pivot through the hub, and upon which the parts of the hub may be turned to some extent, each independent of the other. As represented in Fig. 1, the axles consist of a screw, F, introduced free through the arms B, and screwed into the arms D, and are also loose through the pulley, as seen in Fig. 5, and so that the pulley may turn freely thereon.

Outside of the arm B, and beneath the head of the screw, a spring, *b*, is introduced to bear against the arm B, and so that the arm B being free on the screw the tendency of the spring is to force it against the pulley and toward the opposite arm, and thereby grasp the pulley between the two arms to the extent of the power of the spring $b$. Each of the screws is preferably provided with a like spring. The pressure of the arms upon the pulleys may be adjusted by the screws through the springs.

While I prefer to arrange a spring upon each screw or to each pulley, it will be evident that a single spring may answer the purpose. Inasmuch as one hub and its arms may turn upon the axis $a$ independent of the other, it follows that if one arm B be drawn toward its opposite arm, D, all the others must be accordingly forced toward each other; hence the spring-pressure being applied to one arm to grasp the pulley between it and its opposite arm all the pulleys will be alike grasped between their respective arms.

The axles for the pulleys may all be free—that is, fixed in one arm only, as seen in Fig. 6, but free through the pulley and opposite arm—then a screw introduced through one arm into the opposite arm, as indicated in broken lines at $d$, Fig. 1, the head of the screw bearing upon one arm and the screw tapped into the opposite arm, will draw the two arms together. This would produce a constant and unyielding friction; but the same spring may be applied beneath the head of the screw, as before described, and thereby make a yielding friction.

The spring $b$ may be omitted under the first arrangement described, the clamping being made positive and rigid, yet I prefer in all cases a yielding pressure; or a spring may be introduced upon the inside between the arm and the pulley, as indicated in Fig. 7.

For a two-pulley hanger I provide a straight bar which forms two arms, H H, and a second bar, parallel with the first, which forms two arms, I I. Between the ends of the arms the pulleys E are arranged, as between the arms in the first illustration, and through one arm and pulley into the opposite arm pivots are applied in the same manner. In this construction the suspending device is best made in the form of a loop, L, made as a part of the arm I, the central portion of the arms turned inward to bring the loop into a central plane between the pulleys, as indicated in Fig. 8; and that the pull may come alike upon both arms I construct the opposite arm, H, with lugs $e$, which extend across and bear upon the top of the opposite arm, as shown in Figs. 8, 9, and 10.

As in the first illustration, the spring may be applied upon the axle; or it may be produced by a central screw, $f$, (indicated in broken lines, Fig. 8,) having a spring applied thereto. In this case the axles may be as shown in Fig. 6.

I claim—

1. A suspension-pulley consisting of the hanger constructed in two parts and extending from the central support to form pairs of arms, the said arms adjustable toward and from each other, combined with a pulley hung upon an axle between each pair of arms, and a screw through one arm into the opposite arm, whereby said arms may be made to grasp the said pulleys with frictional contact, substantially as described.

2. A suspension-pulley consisting of the hanger constructed in two parts and extending from the central support to form pairs of arms, a pulley arranged upon an axle between each pair of arms, and a screw through one arm into the opposite arm, and by which said arms may be forced upon said pulleys, with a spring against which the pressure of the said screw will be applied, and whereby said pressure is made yielding, substantially as described.

3. A suspension-pulley consisting of the hanger constructed in two parts and extending from the central support to form pairs of arms, a pulley arranged upon an axle between each pair of arms, a screw extending through one arm, through the pulley, and into the opposite arm to form an axle for one pulley, and a spring arranged between the said screw and pulley, whereby the pressure of the said screw upon the pulley is made yielding, substantially as described.

4. A suspension-pulley consisting of a hanger composed of two hubs, A C, one, A, of said hubs constructed with two or more arms, B, and the other hub, C, constructed with corresponding arms, D, the said arms extending from the hub parallel with each other, a pulley arranged upon an axle between each pair of arms, and a screw through one arm into the opposite arm and adapted to draw the said arms toward each other, whereby said pulleys are frictionally grasped between said arms, substantially as described.

5. A suspension-pulley consisting of a hanger composed of two hubs, A C, one, A, of said hubs constructed with two or more arms, B, and the other hub, C, constructed with corresponding arms, D, the said arms extending from the hub parallel with each other, a pulley arranged upon an axle between each pair of arms, and a screw through one arm into the opposite arm and through the pulley between them, and so as to form the axle for the said pulley, with a spring between said screw and pulley, whereby the pressure of the screw to draw the arms upon the pulley is made yielding, substantially as described.

6. A suspension-pulley consisting of a hanger composed of two hubs, A C, the one, A, of said hubs constructed with two or more arms, B, and the other hub, C, constructed with corresponding arms, D, the said arms extending from the hub parallel with each other, a screw, F, extending free through one arm into the opposite arm of each pair, a pulley, E, arranged upon each of said screws as an axle, and a spring, $b$, between the head of the screw and the arm, substantially as described.

JOHN A. EVARTS.

Witnesses:
W. R. BOOTH,
R. P. RAND.